US009509037B2

(12) United States Patent
Davis et al.

(10) Patent No.: US 9,509,037 B2
(45) Date of Patent: Nov. 29, 2016

(54) ANTENNA LIFTING APPARATUS AND RELATED TECHNIQUES

(71) Applicant: Raytheon Company, Waltham, MA (US)

(72) Inventors: Stacy E. Davis, Medway, MA (US); Matthew J. Flom, Chesapeake, VA (US); Adam J. Trimby, Sterling, MA (US)

(73) Assignee: Raytheon Company, Waltham, MA (US)

( * ) Notice: Subject to any disclaimer, the term of this patent is extended or adjusted under 35 U.S.C. 154(b) by 43 days.

(21) Appl. No.: 14/462,848

(22) Filed: Aug. 19, 2014

(65) Prior Publication Data

US 2016/0056524 A1 Feb. 25, 2016

(51) Int. Cl.
*F16M 11/00* (2006.01)
*H01Q 1/12* (2006.01)

(52) U.S. Cl.
CPC ............ *H01Q 1/125* (2013.01); *H01Q 1/1235* (2013.01)

(58) Field of Classification Search
USPC .......................................................... 248/127
See application file for complete search history.

(56) References Cited

U.S. PATENT DOCUMENTS

| | | | | |
|---|---|---|---|---|
| 5,961,092 A * | 10/1999 | Coffield | H01Q 1/125 | 248/230.1 |
| 6,111,553 A | 8/2000 | Steenbuck | | |
| 6,195,066 B1 * | 2/2001 | Pegues, Jr. | H01Q 1/1221 | 248/237 |
| 6,714,170 B2 * | 3/2004 | Kleinschmidt | H01Q 1/1235 | 343/713 |
| 7,557,764 B2 * | 7/2009 | Krajicek | H01Q 1/3275 | 343/713 |
| 7,775,496 B2 * | 8/2010 | Johnson | E04C 3/005 | 248/351 |
| 7,852,274 B2 * | 12/2010 | Madden, Jr. | H01Q 1/1207 | 343/713 |
| 9,118,106 B2 * | 8/2015 | Adams | H01Q 1/12 | |
| 2003/0107526 A1 | 6/2003 | Kleinschmidt | | |
| 2008/0136718 A1 * | 6/2008 | Tietjen | H01Q 1/1235 | 343/711 |

FOREIGN PATENT DOCUMENTS

| | | |
|---|---|---|
| CN | 201345408 | 11/2009 |
| WO | WO 8502242 | 5/1985 |
| WO | WO 02100758 | 12/2002 |
| WO | WO 2007070897 | 6/2007 |
| WO | WO 2012069691 | 5/2012 |

OTHER PUBLICATIONS

U.S. Appl. No. 15/015,714, filed Feb. 4, 2016, Davis et al.
(Continued)

*Primary Examiner* — Monica Millner
(74) *Attorney, Agent, or Firm* — Daly, Crowley, Mofford & Durkee, LLP

(57) ABSTRACT

A method of raising an antenna includes decoupling an antenna pedestal from an antenna pedestal mounting structure. The method additionally includes separating the antenna pedestal from the antenna pedestal mounting structure using one or more lifting rods. The method further includes inserting one or more antenna lifting fixtures between a first surface of the antenna pedestal and a first surface of the antenna pedestal mounting structure. The method also includes operating the one or more antenna lifting fixtures to move the first surface of the antenna pedestal away from the first surface of the antenna pedestal mounting structure. A corresponding system and antenna lifting fixture is also provided.

18 Claims, 11 Drawing Sheets

(56) References Cited

OTHER PUBLICATIONS

Search Report and Written Opinion dated Apr. 28, 2015 for PCT Application No. PCT/US2014/051646; 11 pages.
Search Report and Written Opinion dated Apr. 29, 2015 for PCT Application No. PCT/US2014/051646; 11 pages.
Office Action dated Jun. 10, 2016 for U.S. Appl. No. 15/015,714, 6 pages.
Response to Office Action filed Jul. 20, 2016 for U.S. Appl. No. 15/015,714; 6 pages.
Notice of Allowance dated Aug. 10, 2016 for U.S. Appl. No. 15/015,714, 5 pages.

* cited by examiner

ANTENNA LIFTING APPARATUS AND RELATED TECHNIQUES

GOVERNMENT RIGHTS

This invention was made with government support under Contract No. N00039-04-C-0012 awarded by the Department of the Navy. The government has certain rights in this invention.

CROSS REFERENCE TO RELATED APPLICATION

None.

FIELD

This disclosure relates generally to antennas and, more particularly, to an antenna lifting apparatus and related techniques.

BACKGROUND

As is known, antennas typically found on ships, aircraft, vehicles, radar equipped ground stations and the like comprise components (e.g., power supplies, data processing circuitry, GPS receivers, RF switching network) which have a service life (or expected lifetime). In some instances these components fail before the service life and In other instances these components fail after the service life depending upon factors including but not limited to total time of use, nature of use (e.g., extended use vs. periodic use) and operating conditions (e.g., exposure of components to environment and ambient levels). Upon component failure, a decision often needs to be made as to whether the one or more components failing should be repaired, replaced, or if the antenna as a whole should be completely or partially replaced.

Given the high cost of antennas, there is a push to extend the service life of antennas by repairing or replacing failed components versus completely or partially replacing the antenna. However, repairing or replacing these components is neither a trivial nor an inexpensive task, especially for larger antennas spanning meters in length and weighing hundreds or even thousands of pounds. Often, a crane, an experienced crane operator, and experienced technical personnel are required to precisely hoist and remove a radome enclosing the antenna and raise the antenna from a mounting surface on which the antenna is coupled in order for the failed components to be accessed and repaired or replaced by the experienced technical personnel. Additionally, in instances where the antenna is on a ship, the ship generally cannot be in motion and in some cases needs to return to shore (e.g. a port) in order for the radome to be hoisted and removed and the antenna raised by the crane, experienced crane operator, and experienced technical personal. Safety is often a concern as well given the sheer size and weight of the antenna (which can be several meters high and weigh several thousand pounds) and potential frailty of the radome (e.g., cracks in the radome can impact antenna performance). Additionally, in environments where weather conditions can vary drastically, removal of the radome and raising the antenna generally needs to be conducted within a narrow weather window to ensure the safest conditions, which is undesirable.

SUMMARY

The present disclosure relates generally to an antenna lifting apparatus and related techniques the use of which simplify and reduce the costs of repairing and/or replacing failed components in an antenna. Simplifying and reducing the costs of repairing and/or replacing failed components in an antenna extends the service life of the antenna.

In one aspect of the concepts described herein, an antenna lifting fixture for separating an antenna pedestal from an antenna pedestal mounting structure includes a plurality of threaded lifting rods, each of the threaded lifting rods having a first end configured to be coupled to the antenna pedestal and a second, opposing end configured to be coupled to the antenna pedestal mounting structure and each of the plurality of threaded lifting rods having a length selected to space the antenna pedestal a predetermined distance from the antenna pedestal mounting structure. The antenna lifting fixture further includes a like plurality of first mounting plates, each configured to be movably coupled to the first end of a corresponding one of the threaded lifting rods and each of the first mounting plates having a shape adapted to couple to the antenna pedestal. The antenna lifting fixture further includes a like plurality of second mounting plates, each configured to be movably coupled to the second end of a corresponding one of the threaded lifting rods and each having a shape adapted to couple to said antenna pedestal mounting structure.

With this particular arrangement, an antenna lifting fixture for separating an antenna pedestal from an antenna pedestal mounting structure is provided. The antenna lifting fixture differs from conventional antenna lifting in that a crane and an experienced crane operator are not required to remove a radome enclosing the antenna and/or raise the antenna.

By utilizing the plurality of threaded lifting rods, the pedestal of an antenna to be lifted may be separated from an antenna mounting structure by threading the rods into threaded openings of the antenna mounting structure and raising the antenna a distance from the antenna mounting structure which is sufficient for a worker to access an internal antenna pedestal cavity and a variety of mechanical structures and electrical components inside the cavity. Furthermore, the threaded lifting rods enable the antenna to be raised substantially or even completely within the confines of the radome. Thus, in contrast to prior art techniques, by utilizing the plurality of threaded lifting rods, it is not necessary to remove a radome from the antenna. Moreover, utilizing the threaded lifting rods results in the antenna being be raised safely and stably while a surface on which the antenna is mounted (e.g., surface of a ship) is in motion.

Thus, the antenna lifting fixture disclosed herein provides a more cost effective, safer, and simpler means of raising an antenna relative to conventional systems.

In a further aspect of the concepts described herein, a method of raising an antenna includes decoupling an antenna pedestal from an antenna pedestal mounting structure, separating the antenna pedestal from the antenna pedestal mounting structure using one or more lifting rods and inserting one or more antenna lifting fixtures between a first surface of the antenna pedestal and a first surface of the antenna pedestal mounting structure. The method also includes operating the one or more antenna lifting fixtures to move the first surface of the antenna pedestal away from the first surface of the antenna pedestal mounting structure.

With this particular arrangement, an antenna lifting method for separating an antenna pedestal from an antenna pedestal mounting structure is provided.

By utilizing the plurality of threaded lifting rods, the pedestal of an antenna to be lifted may be separated from an antenna mounting structure by threading the rods into threaded openings of the antenna mounting structure and raising the antenna a distance from the antenna mounting structure which is sufficient for a worker to access an internal antenna pedestal cavity and a variety of mechanical structures and electrical components inside the cavity. Furthermore, the threaded lifting rods enable the antenna to be raised substantially or even completely within the confines of the radome. Thus, in contrast to prior art techniques, by utilizing the plurality of threaded lifting rods, it is not necessary to remove a radome from the antenna. Moreover, utilizing the threaded lifting rods results in the antenna being be raised safely and stably while a surface on which the antenna is mounted (e.g., surface of a ship) is in motion.

Thus, the antenna lifting method disclosed herein provides a technique for raising an antenna which is more cost effective, safer, and simpler relative to conventional methods.

In one embodiment, the method further includes removing the lifting rods after inserting the antenna lifting fixtures. In another embodiment, the method further includes securing a first portion of the antenna lifting fixture to the antenna pedestal. In another embodiment, the method further includes securing a second portion of the antenna lifting fixture to the antenna pedestal mounting structure. The first portion of the antenna lifting fixture is movable with respect to the second portion of the antenna lifting fixture.

In some embodiments, decoupling the antenna pedestal from the antenna pedestal mounting structure includes unbolting the antenna pedestal from the antenna pedestal mounting structure. Additionally, in some embodiments operating the one or more lifting structures includes rotating a threaded lifting rod of at least one of the one or more lifting structures having first and second opposing ends in a direction such that a distance between the first surface of the antenna pedestal and the first surface of the antenna pedestal mounting structure is increased.

In some embodiments, separating the antenna pedestal from the antenna pedestal mounting structure using one or more lifting rods includes installing a plurality of lifting rods into respective ones of a corresponding plurality of threaded holes in the antenna pedestal. First ends of the lifting rods are disposed in respective openings in the first surface of the antenna pedestal mounting structure and second threaded ends of the plurality of lifting rods are disposed in respective ones of the corresponding plurality of threaded holes in the antenna pedestal. In one embodiment, separating the antenna pedestal from the antenna pedestal mounting structure using one or more lifting rods additionally includes surrounding each one of the plurality of lifting rods with respective standoffs, Each one of the respective standoffs has a first surface facing the first surface of the antenna pedestal and a second surface facing and adapted to couple to the first surface of the antenna pedestal mounting structure.

In another aspect, a system includes an antenna pedestal having a first surface and an antenna pedestal mounting structure having a first surface. The system additionally includes an antenna lifting fixture comprising a threaded lifting rod having first and second opposing ends disposed between the antenna pedestal and the antenna pedestal mounting structure. The antenna lifting fixture additionally comprises a first mounting plate movably coupled to the first end of the threaded lifting rod. The first mounting plate is adapted to couple to the first surface of the antenna pedestal, The antenna lifting fixtures further comprises a second mounting plate movably coupled to the second end of the threaded lifting rod. The second mounting plate is adapted to couple to the first surface of the antenna pedestal mounting structure.

In one embodiment, the system further includes one or more additional antenna lifting fixtures. In another embodiment, the system includes two additional antenna lifting fixtures. Each of the three antenna lifting fixtures is spaced substantially equidistant from each other around the perimeter of the antenna pedestal and the antenna pedestal mounting structure.

In some embodiments, the system further includes one or more lifting rods installed into respective ones of corresponding threaded holes in the antenna pedestal. First ends of the one or more lifting rods are disposed in ones of respective openings in the first surface of the antenna pedestal mounting structure. Second threaded ends of the one or more lifting rods are disposed in respective ones of the corresponding threaded holes in the antenna pedestal.

In some embodiments, the system further includes standoffs surrounding each one of the one or more lifting rods. Each one of the standoffs has a first surface facing the first surface of the antenna pedestal and a second surface facing and adapted to couple to the first surface of the antenna pedestal mounting structure. In one embodiment, the second surface of the standoffs is bolted to the first surface of the antenna pedestal mounting structure. In another embodiment, the standoffs comprise a bearing which in one embodiment is provided as a thrust bearing and in some embodiments is coupled to clamp. The clamp, in one embodiment, is provided as a threaded clamp. The bearing is capable of surrounding respective ones of the lifting rods and the first and/or second ends of the lifting rods are capable of being lowered into the bearing.

In one embodiment, the antenna lifting fixture of the system includes a thrust bearing coupled to a surface between the second mounting plate and the first mounting plate. In another embodiment, the thrust bearing is adapted to surround the threaded lifting rod such that first and/or second ends of the lifting rod may be lowered into the thrust bearing.

In another aspect, an antenna lifting fixture for separating an antenna pedestal from an antenna pedestal mounting structure includes a plurality of threaded lifting rods, each of the threaded lifting rods having a first end configured to be coupled to the antenna pedestal and a second, opposing end configured to be coupled to the antenna pedestal mounting structure. Each of the plurality of threaded lifting rods has a length selected to space the antenna pedestal a predetermined distance from the antenna pedestal mounting structure. The antenna lifting fixture additionally includes a like plurality of first mounting plates. Each of the first mounting plates is configured to be movably coupled to the first end of a corresponding one of the plurality of threaded lifting rods. Additionally, each of the plurality of first mounting plates has a shape adapted to couple to the antenna pedestal.

The antenna lifting fixture further includes a like plurality of second mounting plates. Each of the first mounting plates is configured to be movably coupled to the second end of a corresponding one of the plurality of threaded lifting rods. Additionally, each of the plurality of second mounting plate has a shape adapted to couple to the antenna pedestal mounting structure.

In one embodiment, the antenna lifting fixture further includes a thrust bearing coupled to a surface between the second mounting plate and the first mounting plate, In one embodiment, the thrust bearing is adapted to surround the threaded lifting rod such that first and/or second ends of the threaded lifting rod may be lowered into the thrust bearing.

In another embodiment, the threaded lifting rods are provided as jack screws or as part of a scissor jack or a hydraulic lifting mechanism.

BRIEF DESCRIPTION OF THE DRAWINGS

Features and advantages of the concepts, systems and techniques disclosed herein will be apparent from the following description of the embodiments taken in conjunction with the accompanying drawings in which:

FIG. 50 is a block diagram of another example configuration of the antenna lifting fixture of FIG. 5A;

DETAILED DESCRIPTION

Figure 1:
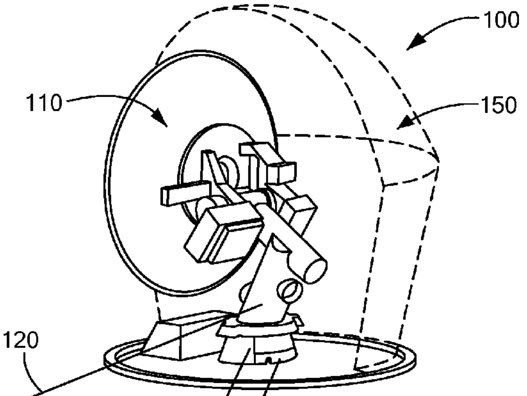
FIG. 1 (PRIOR ART)
FIG. 1 is a block diagram of an example conventional antenna including an antenna pedestal and an antenna pedestal mounting structure.

The features and other details of the concepts, systems, and techniques sought to be protected herein will now be more particularly described, it will be understood that any specific embodiments described herein are shown by way of illustration and not as limitations of the disclosure. The principal features of this disclosure can be employed in various embodiments without departing from the scope of the concepts sought to be protected. Embodiments of the present disclosure and associated advantages may be best understood by referring to the drawings, where like numerals are used for like and corresponding parts throughout the various views.

Referring now to FIG. 1, an example antenna system 100 includes an antenna assembly 110 coupled to an antenna pedestal assembly 120 which is disposed on and coupled to an antenna pedestal 130. Antenna pedestal 130 is, in turn, disposed on and coupled to an antenna pedestal mounting structure 140. Antenna pedestal mounting structure 140 is not part of the antenna system 110. The antenna system 100 may also include a radome 150. Radome 150 is disposed over one or more of the antenna assembly 110, the antenna pedestal assembly 120, the antenna pedestal 130, and is suitable for enclosing one or more of the antenna assembly 110, the antenna pedestal assembly 120, and the antenna pedestal 130, in some embodiments, radome 150 may also enclose all or portions of the antenna pedestal mounting structure 140. In the example embodiment shown, the radome 150 is separate from the antenna assembly 110. In some applications, the radome 150 may be provided as part of the antenna assembly 110.

In this particular example, antenna assembly 110 includes a reflector antenna, although other antenna types may also be used. As will become apparent from the description herein below, the particular type of antenna included in the antenna assembly is unrelated to the antenna lifting fixture and techniques described herein. Rather, the antenna lifting concepts, fixture and techniques described herein find use with a wide variety of different types of antenna, antenna assemblies and antenna systems.

In the example embodiment shown, the antenna system 100, may be coupled to a fixed or a moving platform (e.g. a surface of a ship or other moving platform), for example. Antenna system 100 is configured to transmit and/or receive radio-frequency (RF) signals via the antenna assembly 110 from one or more remote locations. The antenna assembly 110, which according to one embodiment Includes one or more antenna elements and an antenna electronics system communicatively coupled, is adapted to couple to a mounting surface (e.g., a surface of a ship) through the antenna pedestal assembly 120, the antenna pedestal 130 and the antenna pedestal mounting structure 140. In one embodiment, the antenna pedestal mounting structure 140 is provided as part of the platform (e.g. the antenna pedestal mounting structure 140 is provided as part of the deck of a ship). In other embodiments, the antenna pedestal mounting structure 140 is itself mechanically coupled (e.g. bolted or welded or otherwise attached) to the platform (e.g. the antenna pedestal mounting structure 140 is coupled to the deck of a ship). Regardless of the manner in which the antenna pedestal mounting structure 140 is provided, the antenna lifting concepts, fixture and techniques described herein find use with a wide variety of different types of antenna pedestal mounting structures.

As is known, antenna components, including but not limited to components in the antenna electronics system (e.g., power supplies, data processing circuitry, GPS receivers, RF switching network) of the antenna assembly 110 typically have a service life (or expected lifetime). In some embodiments, these components may each have independent service lives which may, for example, depend upon total time of use, nature of use (e.g., extended use vs. periodic use) and operating conditions (e.g., exposure of components to environment and ambient levels). As discussed above, generally when components fail (before, at, or after the service life), a decision must be made as to whether the failed antenna components should be repaired or replaced, individually or collectively, or if the antenna as a whole should be completely or partially replaced. Additionally, as discussed above, given the high cost of antennas, there is a push to extend the service life of antennas and antenna systems (e.g., antenna system 100) by repairing or replacing failed components versus completely or partially replacing the antenna or the antenna system.

In accordance with the concepts, systems, and techniques sought to be protected herein, an antenna lifting fixture and related techniques for raising an antenna, such as the example antenna in antenna system 100 of FIG. 1, are provided. The antenna lifting fixture and related techniques described herein allow, for example, failed antenna components to be accessed and replaced or repaired in a more cost effective, safer, and simpler means than conventional systems and methods (i.e., removal of the radome and raising of the antenna with a crane).

In one embodiment, the antenna lifting fixture and related techniques for raising an antenna discussed herein are capable of raising the antenna substantially or even completely within the confines of the radome 150 (e.g., without the need for the radome 150 to be removed). In some embodiments, personnel may, for example, gain access to the antenna assembly through doors, hatches and/or removable panels on the radome 150 (e.g., near the base of the radome 150). Additionally, in one embodiment, the antenna lifting fixture and related techniques for raising an antenna are capable of raising the antenna substantially or even completely remotely (e.g., on a ship on which the antenna is mounted while away from a port) and while the surface to which the antenna is adapted to couple (e.g., a ship) is in motion. Furthermore, in one embodiment, the antenna lifting fixture and related techniques for raising an antenna provide a means for accessing and repairing or replacing failed antenna components with a reduced number of personnel and a reduced cost in comparison to conventional means (e.g., using a crane) for removing the radome 150 and raising the antenna 100

Figure 1A:
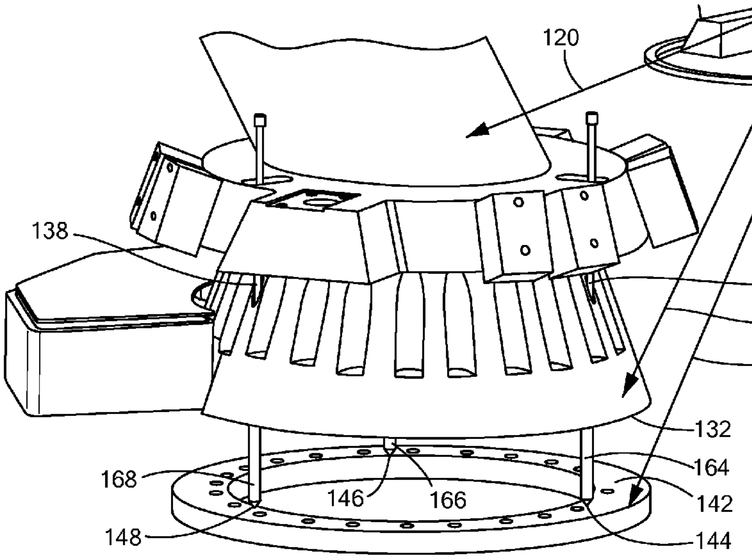
FIG. 1A is a block diagram of a portion of the example antenna of FIG. 1 with the antenna pedestal shown separated from the antenna pedestal mounting structure.

Referring now to FIG. 1A, in which like elements of FIG. 1 are shown having like reference designations, illustrated is a portion of the antenna system 100, with the antenna pedestal 130 decoupled and separated from the antenna pedestal mounting structure 140 using a plurality of lifting rods 164, 166, 168.

In accordance with the concepts, systems, and techniques sought to be protected herein, an example method of raising an antenna (e.g., antenna system 100 of FIG. 1) from a platform to which the antenna system is coupled includes decoupling the antenna pedestal 130 from the antenna pedestal mounting structure 140. In one embodiment, decoupling the antenna pedestal 130 from the antenna pedestal mounting structure 140 comprises unbolting the antenna pedestal 130 from the antenna pedestal mounting structure 140. In another embodiment, decoupling the antenna pedestal 130 from the antenna pedestal mounting structure 140 comprises removing threaded screws, clamps, or other coupling means from the antenna pedestal 130 with respect to the antenna pedestal mounting structure 140 or from the antenna pedestal mounting structure 140 with respect to the antenna pedestal 130.

The example method additionally includes separating the antenna pedestal 130 from the antenna pedestal mounting structure 140 using one or more lifting rods, in the example embodiment shown, the antenna pedestal 130 is separated from the antenna mounting structure 140 using a plurality of lifting rods, here three lifting rods (164, 166, 168). It should, of course, be appreciated that the method described herein may operate with any number lifting rods without limit. In the example embodiment shown, the lifting rods (164, 166, 166) are spaced substantially equidistant from each other (e.g., 120 degrees apart) around the perimeter of the antenna pedestal 130 and the antenna pedestal mounting structure 140. In other embodiments, the lifting rods (164, 166, 168) need not be spaced substantially equidistant from each other.

In one embodiment, separating the antenna pedestal 130 from the antenna pedestal mounting structure 140 includes installing the lifting rods (164, 166, 168) into respective ones of corresponding threaded holes (134, 136, 138) in the antenna pedestal 130. In one embodiment, first ends of the lifting rods (164, 166, 188) are disposed in respective openings (164, 166, 168) in a first surface 142 of the antenna pedestal mounting structure 140 and second threaded ends of the lifting rods are disposed in respective ones of the corresponding threaded holes (134, 136, 138) in the antenna pedestal 130. In one embodiment, the lifting rods (164, 166, 168) are provided as jack screws. In another embodiment, the lifting rods (164, 166, 168) are provided as part of a scissor jack or a hydraulic lifting mechanism.

Figure 2:
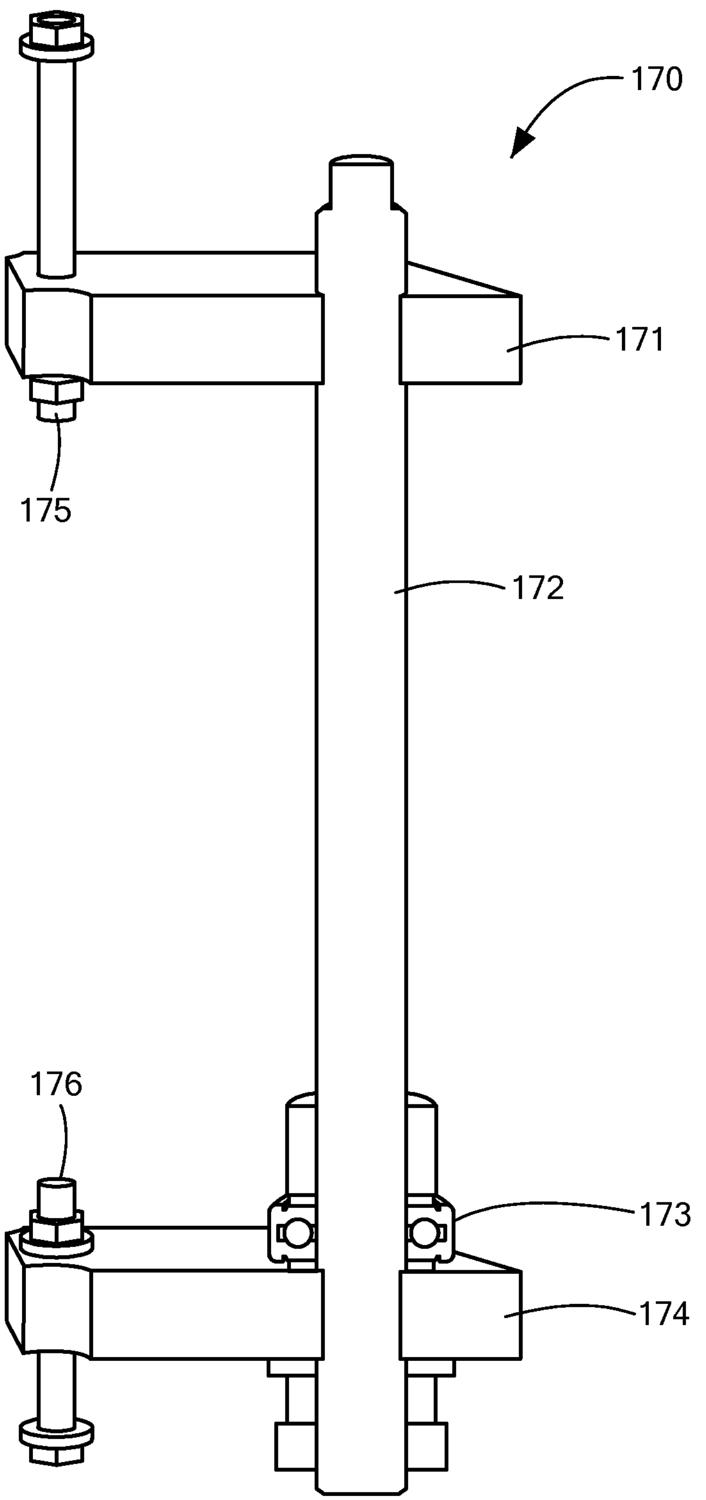
FIG. 2 is a block diagram of an example antenna lifting fixture.
Figure 3:
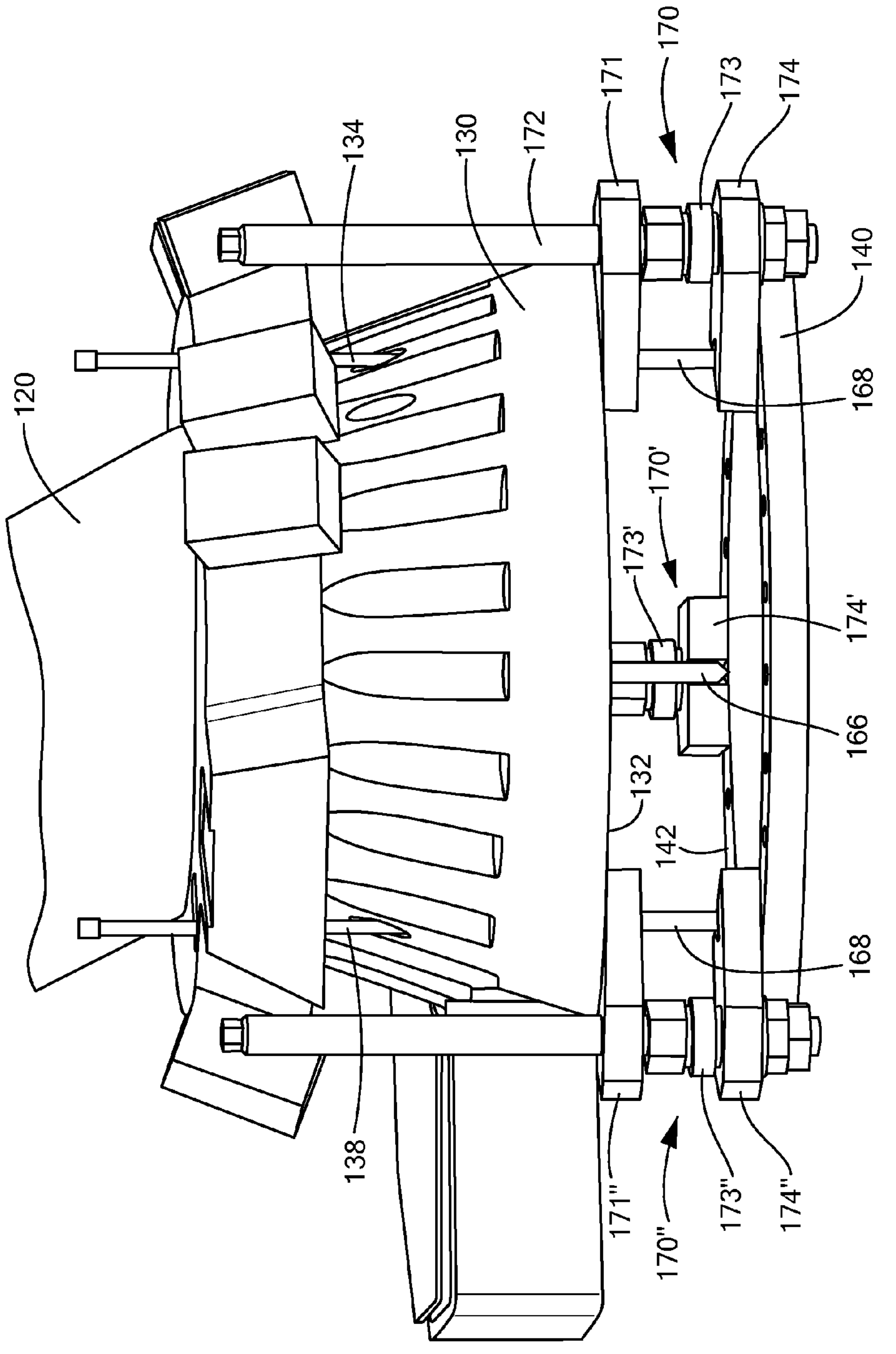
FIG. 3 is a block diagram of a portion of the example antenna of FIG. 1 with an example plurality of antenna lifting fixtures inserted between the antenna pedestal and the antenna pedestal mounting structure.

The example method also includes inserting one or more antenna lifting fixtures, like that which is shown in FIG. 2, between a first surface 132 of the antenna pedestal 130 and the first surface 142 of the antenna pedestal mounting structure 140, as shown in FIG. 3.

Referring briefly to FIG. 2, an example antenna lifting fixture 170 includes a threaded lifting rod 172 having first and second opposing ends, a first mounting plate 171 movably coupled to the first end of the threaded lifting rod 172 , and a second mounting plate 174 movably coupled to the second end of said threaded lifting rod 172. in one embodiment, the antenna lifting fixture 170 additionally includes a thrust bearing 173 coupled to a surface between the second mounting plate 174 and the first mounting plate 171. In one embodiment, the thrust bearing 173 is adapted to surround the threaded lifting rod 172 such that first and/or second ends of the threaded lifting rod 172 may be lowered into the thrust bearing 173. In the example embodiment shown, the threaded lifting rod 172 is provided as a jack screw. In another embodiment, the threaded lifting rod 172 is provided as part of a scissor jack or a hydraulic lifting mechanism. The antenna lifting fixture 170 may additionally include holes in the first mounting plate 171 and/or the second mounting plate 174 for insertion of bolts 175, 176 or other coupling means (e.g., screws or clamps) so that the antenna lifting fixture 170 may be removable coupled to an antenna system (e.g. to an antenna pedestal such as pedestal 134 shown in FIG. 1).

Referring now to FIG. 3, in which like elements of FIGS. 1A and 2 are shown having like reference designations, a plurality of antenna lifting fixtures (here, three antenna lifting fixtures (170, 170', 170") are inserted between the first surface 132 of the antenna pedestal 130 and the first surface 142 of the antenna pedestal mounting structure 140. It should, of course, be appreciated that although three antenna lifting fixtures (170, 170', 170") are shown in the embodiment of FIG. 3, the method described herein may operate with any number antenna lifting fixtures without limit, In one embodiment, the antenna lifting fixtures (170, 170', 170") are spaced substantially equidistant from each other (e.g., 120 degrees apart) around the perimeter of the antenna pedestal 130 and the antenna pedestal mounting structure 140. Additionally, in one embodiment, the lifting rods (164, 166, 168) are removed after inserting the antenna lifting fixtures (170, 170', 170").

Figure 3A:
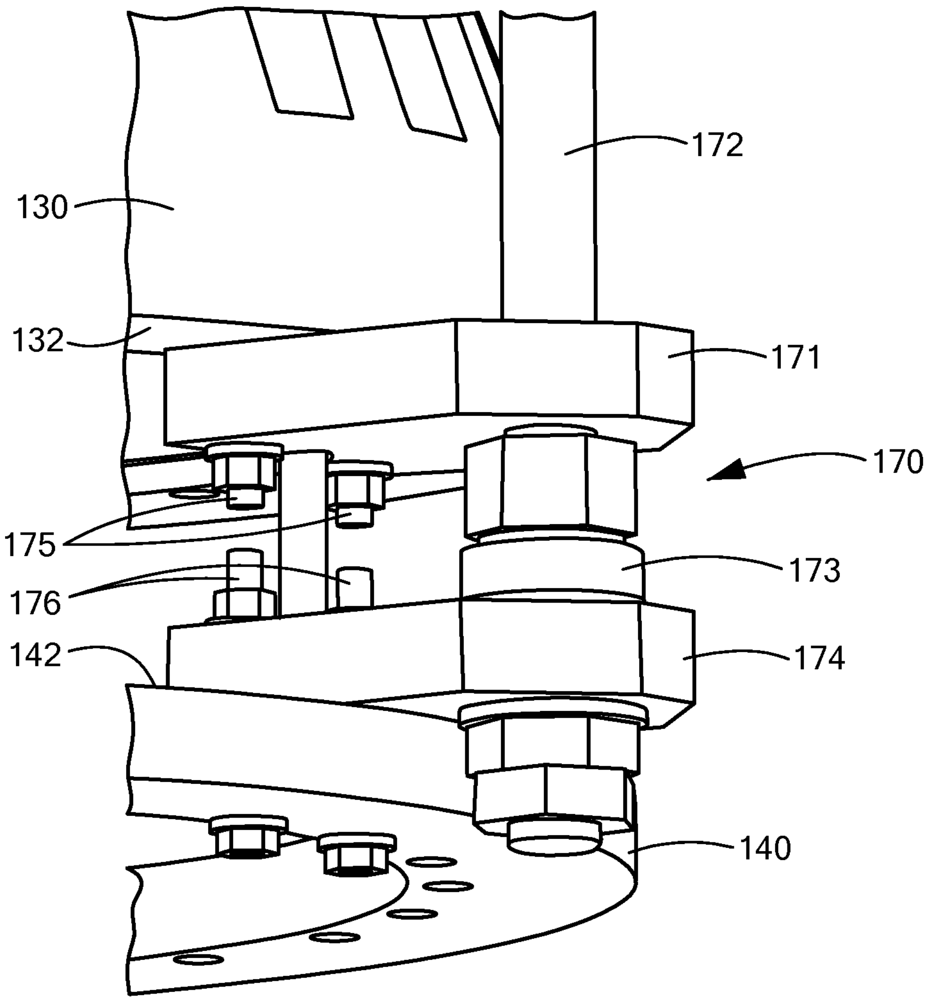
FIG. 3A is a block diagram of one of the antenna lifting fixtures of FIG. 3 secured to the antenna pedestal and the antenna pedestal mounting structure.

In one embodiment, the example method additionally includes securing first portions (i.e., first mounting plates) of the antenna lifting fixtures (170, 170', 170") to the antenna pedestal 130, as shown for one of the antenna lifting fixture (170) in FIG. 3A in which like elements of FIG. 3 are shown having like reference designations. The first mounting plate 171 may, for example, be secured to the first surface 132 of the antenna pedestal 130 by one or more bolts 175 or other coupling means (e.g., screws or clamps) as apparent. Additionally, in one embodiment the method also includes securing second portions (i.e., second mounting plates) of the antenna lifting fixtures to the antenna pedestal mounting structure 140 wherein the first portions (i.e., first mounting plates) of the antenna lifting fixtures (170, 170', 170") are movable with respect to the second portions (e.g., second mounting plates) of the antenna lifting fixtures (170, 170', 170"). Similar to the first mounting plate 171, the second mounting plate 174 may, for example, be secured to the first surface 142 of the antenna pedestal mounting structure 140 by one or more bolts 176 or other coupling means (e.g., screws or clamps) as apparent.

Figure 4:
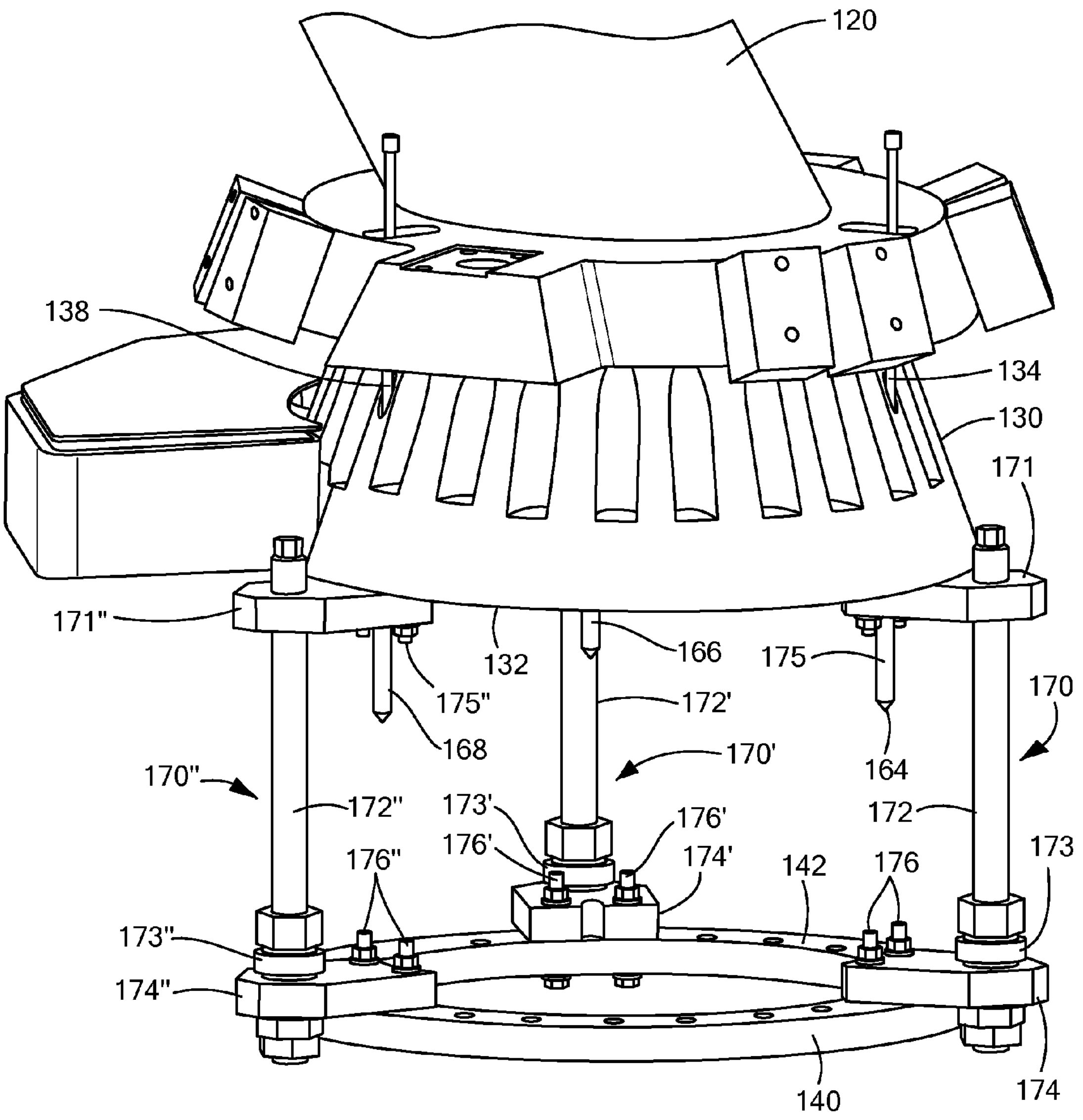
FIG. 4 is a block diagram of a portion of the example antenna of FIG. 1 with the antenna pedestal moved away from antenna pedestal mounting structure upon operation of the plurality of antenna lifting fixtures shown in FIG. 3.

The example method additionally includes operating the one or more antenna lifting fixtures (170, 170', 170") to move the first surface 132 of the antenna pedestal 130 away from the first surface 142 of the antenna pedestal mounting structure 140, as shown in FIG. 4. In one embodiment, operating the one or more antenna lifting fixtures (170, 170', 170") includes rotating a threaded lifting rod (e.g., 172) of at least one of the one or more antenna lifting fixtures (e.g., 170) having first and second opposing ends in a direction such that a distance between the first surface 132 of the antenna pedestal 130 and the first surface 142 of the antenna pedestal mounting structure 140 is increased. In the example embodiment shown, one or more of the threaded lifting rods (172, 172', 172") of the three antenna lifting fixtures (170, 170', 170") may be rotated such that the distance between the first surface 132 of the antenna pedestal 130 and the first surface 142 of the antenna pedestal mounting structure 140 is increased, In another embodiment, where the threaded lifting rods (172, 172', 172") are provided as part of a scissor jack or a hydraulic lifting mechanism, the scissor jack and/or the hydraulic lifting mechanism are operated to move the first surface 132 of the antenna pedestal 130 away from the first surface 142 of the antenna pedestal mounting structure 140.

Figure 5:
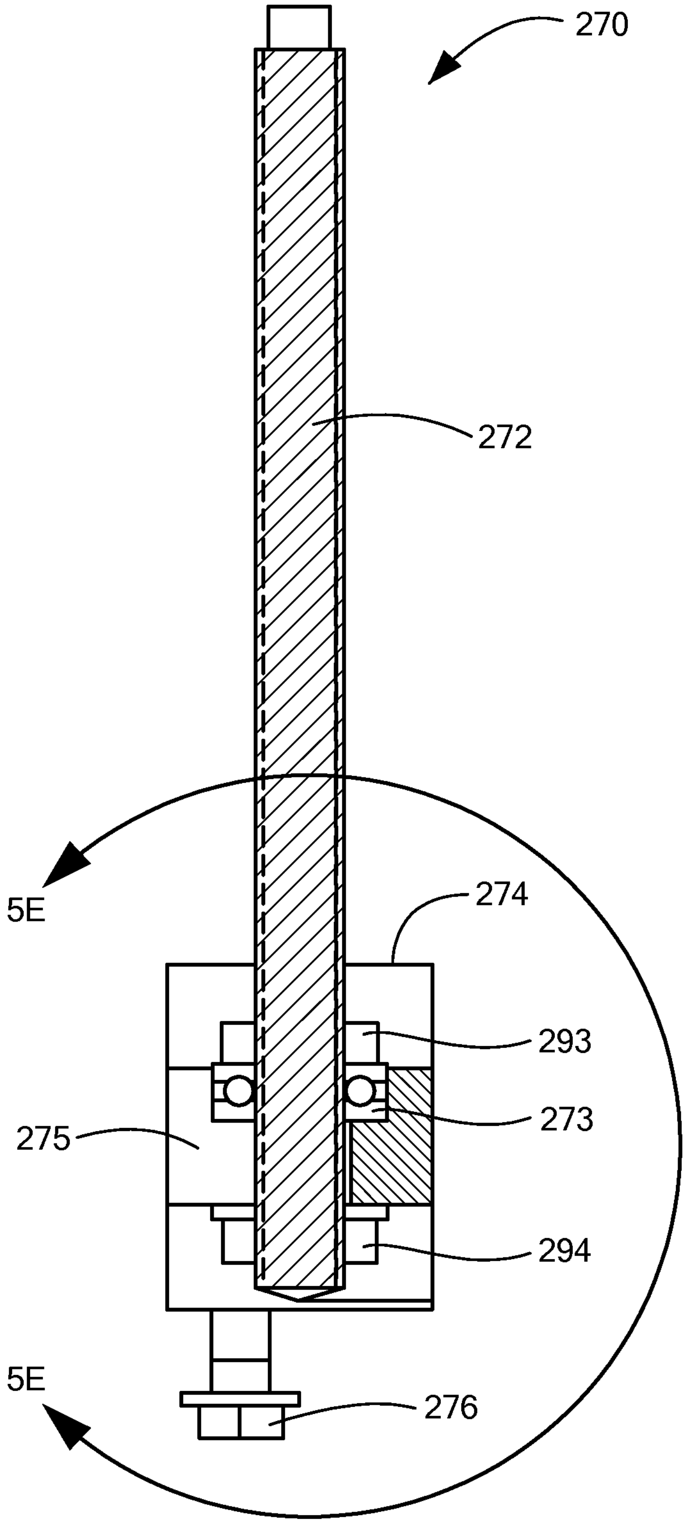
FIG. 5 is a block diagram of a portion of another example antenna lifting fixture.

Referring now to FIG. 5, a portion of another example antenna lifting fixture 270 which may, for example, in some embodiments may be more suitable than lifting fixture 170 of FIG. 2 for substantially larger antennas, includes a threaded lifting rod 272 and a standoff 274. The standoff 274, which has an opening 275 adapted to receive the threaded lifting rod 272, is provided capable of carrying both bending and sheer loads that may result from the weight of an antenna (i.e., shear weight of the antenna) and/or movement of the mounting surface (e.g., surface of a ship) or object (e.g., ship) on which the antenna is mounted. In the example embodiment shown, the opening 275 is on a surface substantially in the center of the standoff 274. However, it should of course be appreciated that in some embodiments the opening 275 may be on a surface that is not substantially in the center of the standoff 274.

In one embodiment, the standoff 274 is provided having a shape similar to that of an I-beam, for example, with the materials of the standoff 274 (e.g., steel) and the thickness of the flanges and web of the standoff 274 being selected based upon the weight of the antenna to be lifted. In such embodiment, the opening 275 may, for example, be on a surface of the web.

Figure 5B:
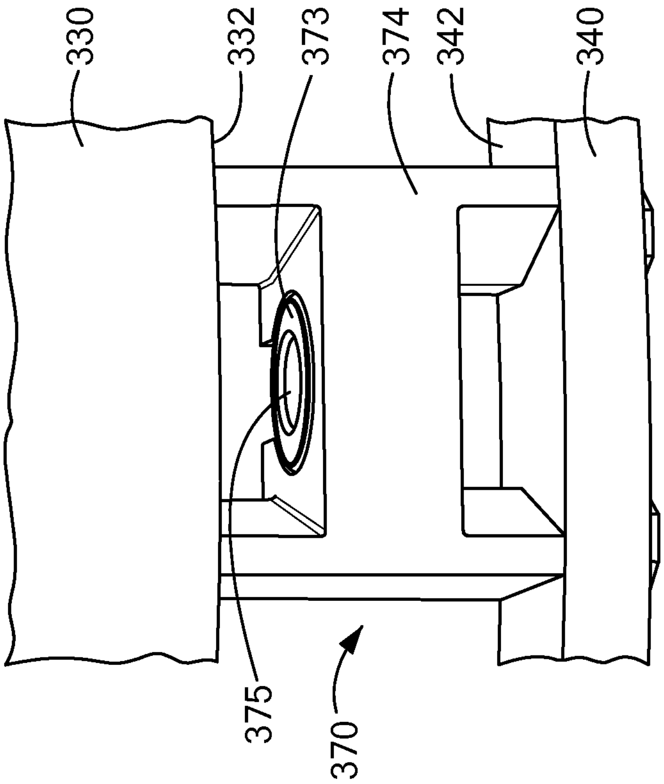
FIG. 5B is a block diagram of an example configuration of the antenna lifting fixture of FIG. 5A.

Additionally, in some embodiments the example antenna lifting fixture 270 includes one or more thrust bearings 273, one or more threaded clamps, or similar means adapted to couple to at least a portion of the opening 275 for receiving the threaded lifting rod 272, as shown in FIGS. 5A-5D. A zoomed perspective view of an example embodiment of a portion of the example antenna lifting fixture 270 is shown in FIG. 5E.

Figure 5A:
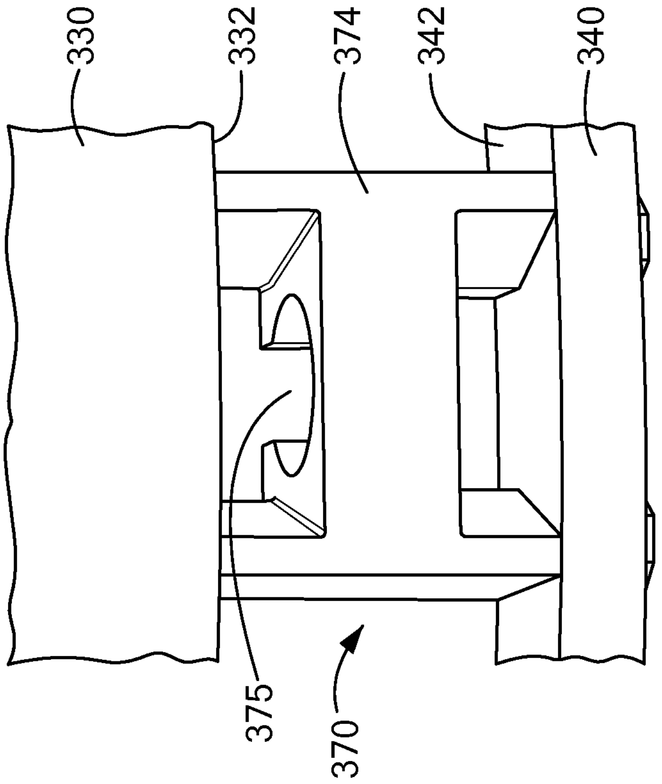
FIG. 5A is a block diagram of an example antenna lifting fixture similar to the antenna lifting fixture of FIG. 5.
Figure 5D:
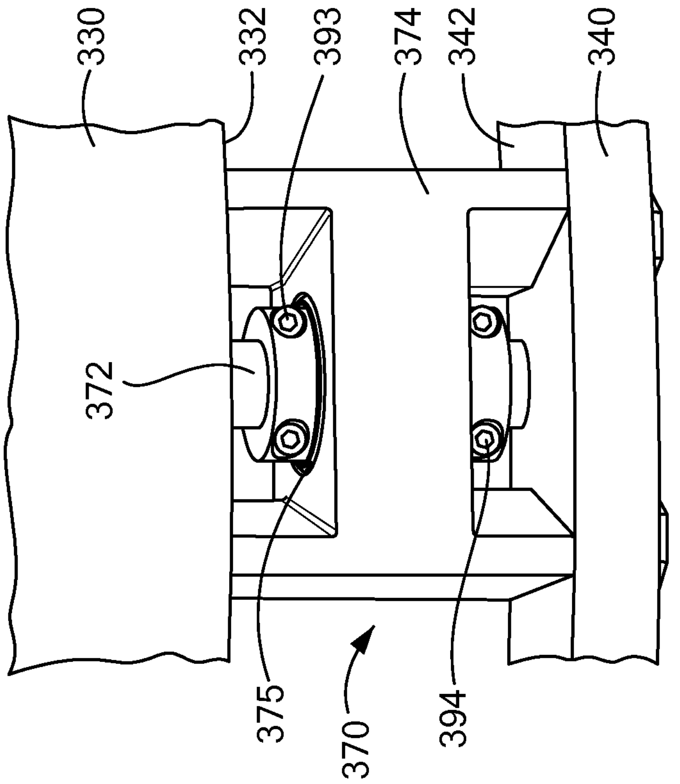
FIG. 5C is a block diagram of another example configuration of the antenna lifting fixture of FIG. 5A.
FIG. 5E is a zoomed perspective view of an example embodiment of a portion of the antenna lifting fixture of FIG. 5.

Referring now to FIG. 5A, an example antenna lifting fixture 370 similar to antenna lifting fixture 270 of FIG. 5 includes a standoff 374 having a first portion adapted to couple to a first surface 332 of an antenna pedestal 330 and a second portion adapted to couple to a first surface 342 of an antenna pedestal mounting structure 340. The standoff 374 has an opening 375 adapted to receive a threaded lifting rod similar to threaded lifting rod 272 of FIG. 5. In one embodiment, the standoff 374 is provided having four sides and first and second opposing surfaces, the first and second surfaces (or first and second portions) having openings 375 adapted to receive the threaded lifting rod 372. In one embodiment, the second portion is coupled to the first surface 342 of the antenna pedestal mounting structure 340 via one or more bolts or similar means.

Referring now to FIG. 5B, an example configuration of the example antenna lifting fixture 370 of FIG. 5A in which like elements of FIG. 5A are shown having like reference designations, includes a thrust bearing 373 coupled to a first surface of the opening 375 adapted to receive the threaded lifting rod. In the example embodiment shown, the thrust bearing 373 is adapted to be movably coupled to the threaded lifting rod. In one embodiment, a distance between the first surface 332 of the antenna pedestal 330 and the first surface 342 of the antenna pedestal mounting structure 340 is increased by rotating the threaded lifting rod such that a distance between the thrust bearing 373 and the first surface 332 of the antenna pedestal 330 is increased.

Figure 5C:
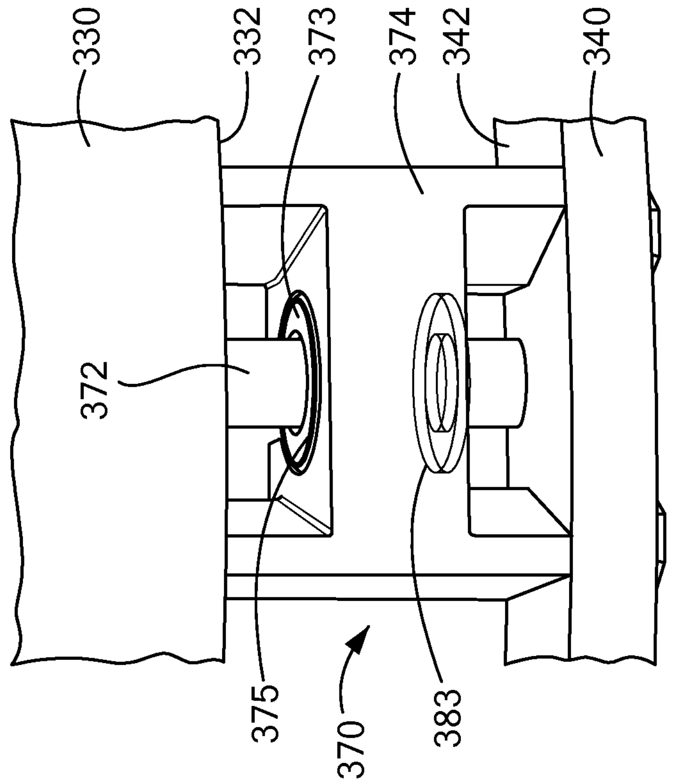
Figure 5E:
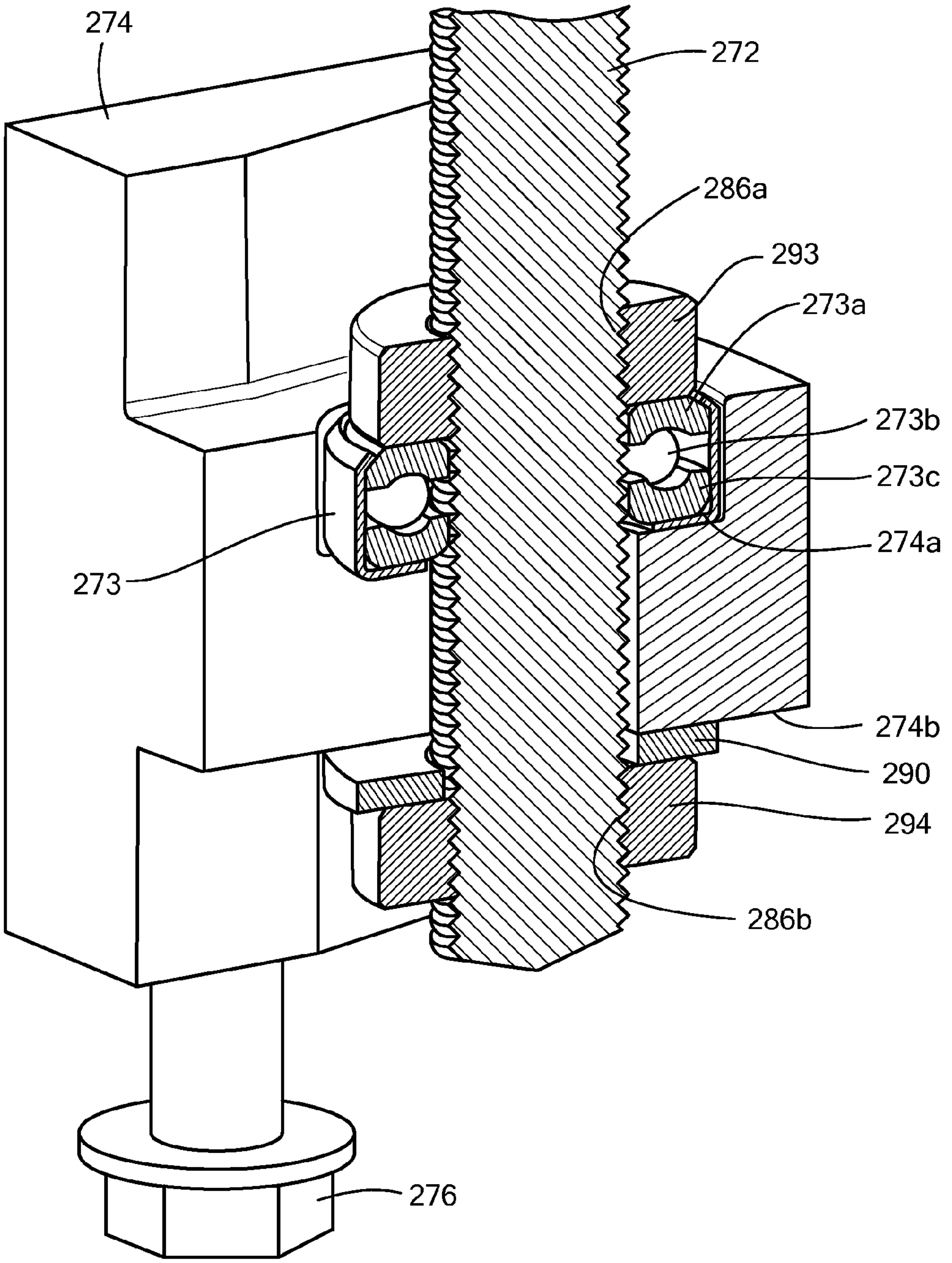

Referring now to FIG. 5C, another example configuration of the example antenna lifting fixture 370 of FIG. 5A in which like elements of FIGS. 5A and 56 are shown having like reference designations includes first and second thrust bearings 373, 383 coupled to first and second surfaces of the opening 375 adapted to receive a threaded lifting rod 372. In the example embodiment shown, the first thrust bearing 373 is adapted to be movably coupled to a first portion of a threaded lifting rod 372 and the second thrust bearing 383 is adapted to be movably coupled to a second portion of the threaded lifting rod 372. In one embodiment, the distance between the first surface 332 of the antenna pedestal 330 and the first surface 342 of the antenna pedestal mounting structure 340 is Increased by rotating the threaded lifting rod 372 such that a distance between the first and second thrust bearings 373, 383 and the first surface 332 of the antenna pedestal 330 is increased.

Referring now to FIG. 5D, another example configuration of the example antenna lifting fixture 370 of FIG. 5A in which like elements of FIG. 5A are shown having like reference designations includes first and second threaded clamps 393, 394 coupled to first and second surfaces of the opening 375 adapted to receive the threaded lifting rod 372. In the example embodiment shown, the first threaded clamp 393 is adapted to be movably coupled to a first portion of a threaded lifting rod 372 and the second threaded clamp 394 is adapted to be movably coupled to a second portion of the threaded lifting rod 372. In one embodiment, the distance between the first surface 332 of the antenna pedestal 330 and the first surface 342 of the antenna pedestal mounting structure 340 is increased by rotating the threaded lifting rod 372 such that a distance between the first and second threaded clamps 393, 394 and the first surface 332 of the antenna pedestal 330 is increased.

Referring now to FIG. 5E, in which like elements of FIG. 5 are provided having like reference designations, an example embodiment of a portion of the antenna lifting fixture 270 of FIG. 5 is shown with standoff 274 provided having a surface 274*a* on which bearing 273 is disposed. As may be more dearly seen in FIG. 5E, bearing 273 is provided as a bearing assembly 273 comprising upper and lower races 273*a*, 273*c* disposed about a plurality of balls 273*b*. Lower race 273*c* includes a sidewall which extends to upper race 273*a*. It should of course, be appreciated that bearing 273 may also be provided using other techniques. In one embodiment, for example, bearing 273 is provided as a thrust bearing.

Upper and lower clamps 293, 294 are secured to lifting rod 272. Here clamps 293, 294 are secured to lifting rod 272 via threaded regions 286*a*, 286*b*. In one embodiment, lifting rod 272 is provided substantially threaded, as shown in FIG. 5E. In other embodiments, lifting rod 272 is provided partially threaded with one or more threaded regions. It should of course, be appreciated that lifting rod 272 may also be provided using other techniques.

Upper clamp 293 is disposed over bearing assembly 273 and lower clamp 294 is spaced from a surface 274*b* in a washer 290 (here shown as a ring washer 290).

Figure 6:
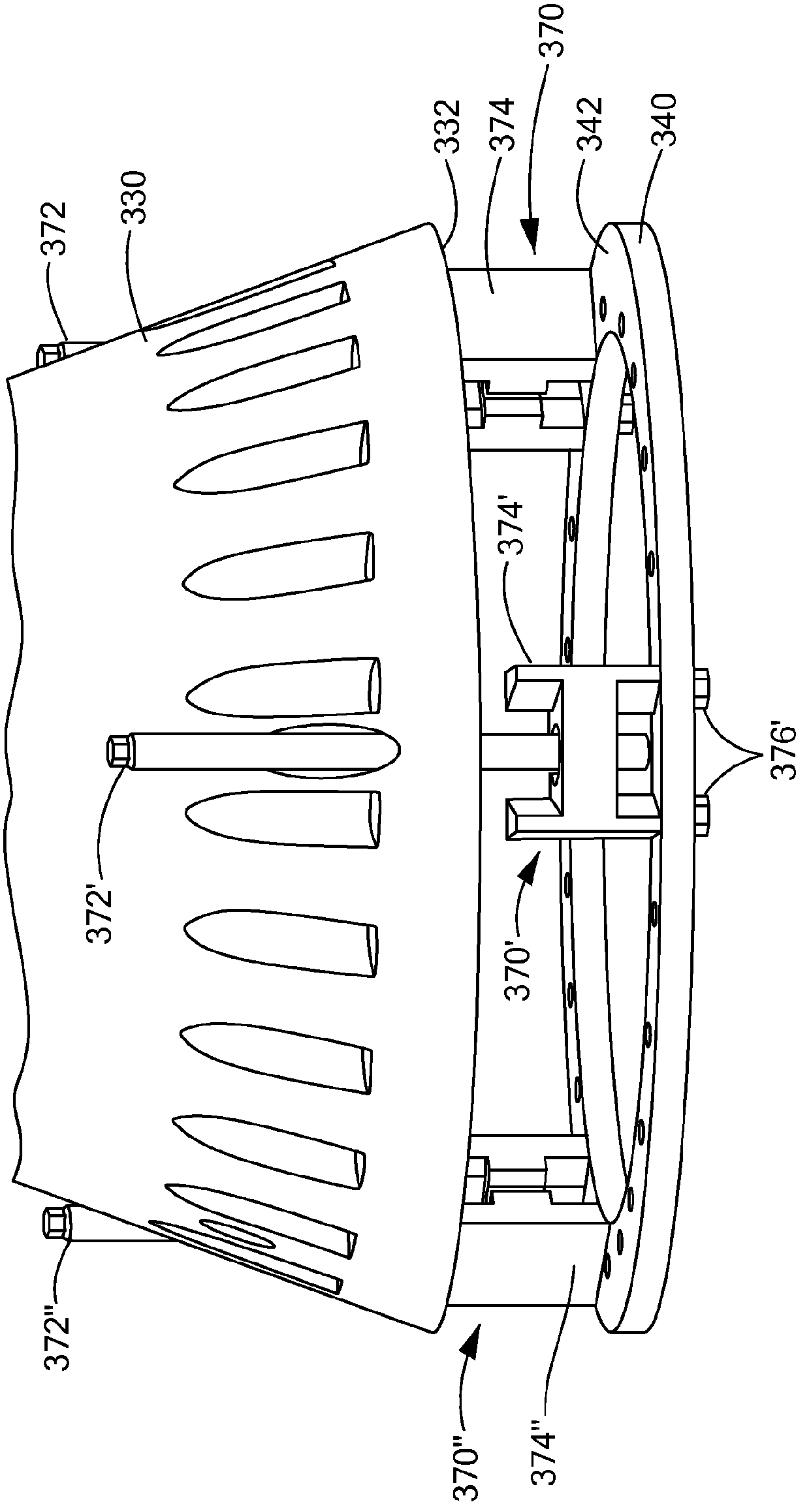
FIG. 6 is a block diagram of a portion of another example antenna with a plurality of antenna lifting fixtures inserted between an antenna pedestal and an antenna pedestal mounting structure of the example antenna.

Referring now to FIG. 6, a portion of another example antenna includes an antenna pedestal 330 and an antenna pedestal mounting structure 340 which are capable of being decoupled and separated from each other as shown. In one embodiment, the antenna pedestal 330 and an antenna pedestal mounting structure 340 are capable of being decoupled and separated in a manner similar to that of the example antenna discussed above in conjunction with FIGS. 1-4. In one embodiment, the antenna pedestal mounting structure 340 is coupled to a mounting surface (e.g., a surface of a ship).

In the example embodiment shown, a plurality of antenna lifting fixtures (370, 370', 370"), which can be the same as or similar to the antenna lifting fixtures described above in conjunction with FIGS. 5-5E, are inserted between a first surface 332 of the antenna pedestal 330 and a first surface 342 of the antenna pedestal mounting structure 340. The plurality of antenna lifting fixtures (370, 370', 370") can, for example, be inserted after the first surface 332 of the antenna pedestal 330 is separated from the first surface 342 of the antenna pedestal mounting structure 340 by a predetermined distance. In one embodiment, the predetermined distance is the height of the antenna lifting fixtures (370, 370', 370"), Additionally, in one embodiment, the antenna lifting fixtures (370, 370', 370") are spaced substantially equidistant from each other around the perimeter of the antenna pedestal 330 and the antenna pedestal mounting structure 340.

In the example embodiment shown, inserting the antenna lifting fixtures (370, 370', 370") also includes installing a plurality of threaded lifting rods (372, 372', 372") into respective ones of a corresponding plurality of threaded holes in the antenna pedestal 330 such that first ends of the lifting rods are disposed in respective openings in the antenna lifting fixtures (370, 370', 370") and the first surface 342 of the antenna pedestal mounting structure 340.

Figure 6A:
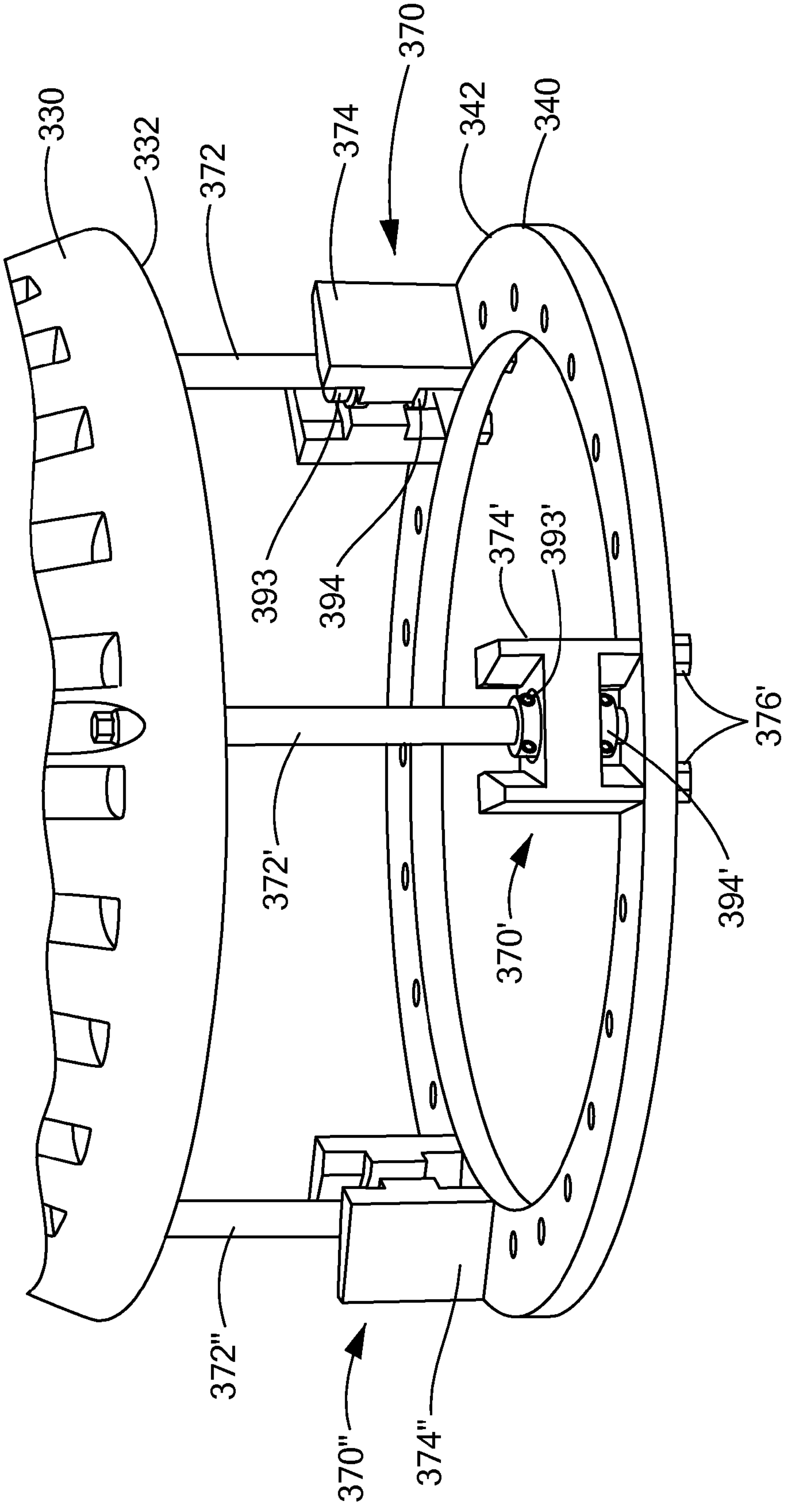
FIG. 6A is a block diagram of a portion of the example antenna of FIG. 6 with another example plurality of antenna lifting fixtures inserted between an antenna pedestal and an antenna pedestal mounting structure of the example antenna.

As discussed above in conjunction with FIGS. 5-5E, the antenna lifting fixtures can, for example, include one or more thrust bearings, one or more threaded clamps, or similar means for receiving the threaded lifting rods. The antenna lifting fixtures shown in FIG. 6A, for example, comprise first and second threaded clamps 393, 394, similar to the antenna lifting fixture shown in FIG. 5D. It is to be appreciated that the thrust bearings, threaded clamp, or similar means may be installed in the standoffs (374, 374', 374") of the antenna lifting fixtures (370, 370', 370") before, during, or after insertion of the antenna lifting fixtures (370, 370', 370") between the first surface 332 of the antenna pedestal 330 and the first surface 342 of the antenna pedestal mounting structure 340.

In one embodiment, where the antenna pedestal 330 is separated from the antenna pedestal mounting structure 340 via lifting rods, the lifting rods may be removed after inserting the lifting fixtures.

The first surface 332 of the antenna pedestal 330 is moved away from the first surface 342 of the antenna pedestal mounting structure 340, for example, through operation of one or more of the antenna lifting fixtures (370, 370', 370"). In one embodiment, such operation occurs by rotating one or more of the threaded lifting rods (372, 372', 372") of the antenna lifting fixtures (370, 370', 370") in a direction such that a distance between the first surface 332 of the antenna pedestal 330 and the first surface 342 of the antenna pedestal mounting structure 340 is increased.

In one embodiment, at least a portion of the second surface (a second portion) of the antenna lifting fixtures (370, 370', 370") is secured to the first surface 342 of the antenna pedestal mounting structure 340 (e.g., via one or more bolts or similar means) before operation of the antenna lifting fixtures (370, 370', 370") for additional safety.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A method of raising an antenna using a plurality of lifting rods, the method comprising:

decoupling an antenna pedestal from an antenna pedestal mounting structure;

separating the antenna pedestal from the antenna pedestal mounting structure using one or more first lifting rods of the plurality of lifting rods;

inserting one or more antenna lifting fixture between a first surface of the antenna pedestal and a first surface of the antenna pedestal mounting structure;

removing the one or more first lifting rods from the antenna pedestal and/or the antenna pedestal mounting structure after inserting the antenna lifting fixtures; and operating the antenna lifting fixtures to move the first surface of the antenna pedestal away from the first surface of the antenna pedestal mounting structure.

2. A method of raising an antenna using a plurality of lifting rods, the method comprising:

decoupling an antenna pedestal from an antenna pedestal mounting structure;

separating the antenna pedestal from the antenna pedestal mounting structure using one or more first lifting rods of the plurality of lifting rods;

inserting one or more antenna lifting fixtures between a first surface of the antenna pedestal and a first surface of the antenna pedestal mounting structure;

securing a first portion of the antenna lifting fixtures to the antenna pedestal; and securing a second portion of the antenna lifting fixtures to the antenna pedestal mounting structure wherein the first portion of the antenna lifting fixtures are movable with respect to the second portion of the antenna lifting fixtures; and operating the antenna lifting fixtures to move the first surface of the antenna pedestal away from the first surface of the antenna pedestal mounting structure.

3. A method of raising an antenna using a plurality of lifting rods, the method comprising:

decoupling an antenna pedestal from an antenna pedestal mounting structure;

separating the antenna pedestal from the antenna pedestal mounting structure using one or more first lifting rods of the plurality of lifting rods;

inserting one or more antenna lifting fixtures between a first surface of the antenna pedestal and a first surface of the antenna pedestal mounting structure; and operating the antenna lifting fixtures between a first surface of the antenna pedestal away from the first surface of the antenna pedestal mounting structure, wherein decoupling the antenna pedestal from the antenna mounting structure comprises unbolting the antenna pedestal from the antenna mounting structure comprises unbolting the antenna pedestal from the antenna pedestal mounting structure.

4. The method of claim 1, wherein separating the antenna pedestal from the antenna pedestal mounting structure using one or more first lifting rods of the plurality of lifting rods comprises:

installing selected ones of the first lifting rods of the plurality of lifting rods into respective ones of a corresponding plurality of threaded holes in the antenna pedestal wherein first ends of the selected ones of the first lifting rods are disposed in respective openings in the first surface of the antenna pedestal mounting structure and second threaded ends of the selected ones of the first lifting rods are disposed in respective ones of the corresponding plurality of threaded holes in the antenna pedestal.

5. The method of claim 1, wherein operating the antenna lifting fixtures comprises:

rotating one or more second lifting rods of the plurality lifting rods in a direction such that a distance between the first surface of the antenna pedestal and the first surface of the antenna pedestal mounting structure is increased, wherein each of the one or more second lifting rods has first and second opposing ends and is provided as part of a corresponding one of the antenna lifting fixtures.

6. A system comprising:

an antenna pedestal having a first surface;

an antenna pedestal mounting structure having a first surface;

one or more first lifting rods for separating the antenna pedestal from the antenna pedestal mounting structure, wherein selected ones of the first lifting rods are installed into respective ones of corresponding threaded holes in the antenna pedestal, wherein first ends of the selected ones of the first lifting rods are disposed in ones of respective openings in the first surface of the antenna pedestal mounting structure and second threaded ends of the selected ones of the first lifting rods are disposed in respective ones of the corresponding threaded holes in the antenna pedestal; and an antenna lifting fixture comprising:

a second lifting rod having first and second opposing ends disposed between the antenna pedestal and the antenna pedestal mounting structure;

a first mounting plate movably coupled to the first end of said second lifting rod, said first mounting plate adapted to couple to the first surface of the antenna pedestal; and a second mounting plate movably coupled to the second end of said second lifting rod, said second mounting plate adapted to couple to the first surface of the antenna pedestal mounting structure.

7. The system of claim 6 further comprising:

one or more additional antenna lifting fixtures.

8. The system of claim 6 further comprising:

two additional antenna lifting fixtures , each of said three antenna lifting fixtures being spaced substantially equidistant from each other around the perimeter of the antenna pedestal and the antenna pedestal mounting structure.

9. The system of claim 6 wherein the antenna lifting fixture of the system further comprises:

a thrust bearing coupled to a surface between said second mounting plate and said first mounting plate.

10. The system of claim 9 wherein said thrust bearing is adapted to surround said second lifting rod such that first and/or second ends of said second lifting rod may be lowered into the thrust bearing.

11. An antenna lifting fixture for separating an antenna pedestal from an antenna pedestal mounting structure comprising:

a plurality of threaded lifting rods, each of said threaded lifting rods having a first end configured to be coupled to the antenna pedestal and a second, opposing end configured to be coupled to the antenna pedestal mounting structure and each of said plurality of threaded lifting rods having a length selected to space the antenna pedestal a predetermined distance from the antenna pedestal mounting structure;

a like plurality of first mounting plates as the plurality of threaded lifting rods, each of said first mounting plates configured to be movably coupled to the first end of a corresponding one of said plurality of threaded lifting rods and each of said first mounting plates having a shape adapted to couple to the antenna pedestal; and a like plurality of second mounting plates as the plurality of threaded lifting rods, each of said first mounting plates configured to be movably coupled to the second end of a corresponding one of said plurality of threaded lifting rods and each of said second mounting plates having a shape adapted to coupled to the antenna pedestal mounting structure.

12. The antenna lifting fixture of claim 11 further comprising:

a like plurality of thrust bearings as the plurality of threaded lifting rods, each of said thrust bearings coupled to a surface between a respective one of said second mounting plates and a respective one of said first mounting plates.

13. The antenna lifting fixture of claim 12 wherein each of said thrust bearings is adapted to surround a respective one of said threaded lifting rods such that first and/or second ends of said threaded lifting rods may be lowered into said thrust bearings.

14. The antenna lifting fixture of claim 11 wherein said threaded lifted rods are provided as jack screws or as part of a scissor jack or hydraulic lifting mechanism.

15. The method of claim 2 wherein operating the antenna lifting fixtures comprises:

rotating one or more second lifting rods of the plurality lifting rods in a direction such that distance between the first surface of the antenna pedestal and the first surface of the antenna pedestal mounting structure is increased, wherein each of the one or more second lifting rods has first and second opposing ends and is provided as part of a corresponding one of the antenna lifting fixtures.

16. The method of claim 2 further comprising:

removing the one or more first lifting rods from the antenna pedestal and/or the antenna pedestal mounting structure after inserting the antenna lifting fixtures.

17. The method of claim 3 wherein operating the antenna lifting fixtures comprises:

rotating one or more second lifting rods of the plurality lifting rods in a direction such that a distance between the first surface of the antenna pedestal and the first surface of the antenna pedestal mounting structure is increased, wherein each of the one or more second lifting rods has first and second opposing ends and is provided as part of a corresponding one of the antenna lifting fixtures.

18. The method of claim 3 further comprising:

removing the one or more first lifting rods from the antenna pedestal and/or the antenna pedestal mounting structure after inserting the antenna lifting fixtures.

* * * * *